(12) United States Patent
Berriot et al.

(10) Patent No.: US 9,175,144 B2
(45) Date of Patent: *Nov. 3, 2015

(54) METHOD FOR PREPARING A MASTERBATCH OF NATURAL RUBBER AND SILICA

(75) Inventors: Julien Berriot, Les Martres de Veyre (FR); Benoit De Gaudemaris, Clermont-Ferrand (FR); Géraldine Laffargue, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/503,593

(22) PCT Filed: Oct. 25, 2010

(86) PCT No.: PCT/EP2010/066044
§ 371 (c)(1),
(2), (4) Date: Jun. 27, 2012

(87) PCT Pub. No.: WO2011/051215
PCT Pub. Date: May 5, 2011

(65) Prior Publication Data
US 2012/0264875 A1 Oct. 18, 2012

(30) Foreign Application Priority Data

Oct. 30, 2009 (FR) ...................................... 09 57694

(51) Int. Cl.
| | |
|---|---|
| *C08J 3/20* | (2006.01) |
| *C08J 3/22* | (2006.01) |
| *B60C 1/00* | (2006.01) |
| *C08J 3/215* | (2006.01) |
| *C08K 3/36* | (2006.01) |
| *C08K 9/02* | (2006.01) |

(52) U.S. Cl.
CPC .............. *C08J 3/226* (2013.01); *B60C 1/0016* (2013.04); *C08J 3/215* (2013.01); *C08K 3/36* (2013.01); *C08K 9/02* (2013.01); *C08J 2307/02* (2013.01); *C08J 2407/00* (2013.01); *C08J 2409/00* (2013.01)

(58) Field of Classification Search
CPC .............. C08L 7/02; C08K 3/36; C08K 3/08
USPC ................ 523/351, 155, 156; 524/575, 575.5
See application file for complete search history.

(56) References Cited

U.S. PATENT DOCUMENTS

| | | |
|---|---|---|
| 3,694,398 A | 9/1972 | Burke, Jr. |
| 4,132,561 A * | 1/1979 | Burke et al. ................. 523/200 |
| 5,227,425 A | 7/1993 | Rauline |
| 5,665,812 A | 9/1997 | Gorce et al. |
| 5,763,388 A | 6/1998 | Lightsey et al. |
| 5,763,398 A * | 6/1998 | Bengtsson ...................... 514/6.9 |
| 5,811,479 A | 9/1998 | Labauze |
| 5,821,290 A | 10/1998 | Labauze |
| 5,852,099 A | 12/1998 | Vanel |
| 5,985,953 A | 11/1999 | Lightsey et al. |
| 6,191,205 B1 | 2/2001 | Micouin et al. |
| 6,313,205 B1 | 11/2001 | Chiron et al. |
| 6,536,492 B2 | 3/2003 | Vasseur |
| 6,765,045 B1 | 7/2004 | Daniel et al. |
| 7,199,175 B2 | 4/2007 | Vasseur |
| 7,900,667 B2 | 3/2011 | Vasseur |
| 2001/0034389 A1 | 10/2001 | Vasseur |
| 2003/0125474 A1* | 7/2003 | Yatsuyanagi .............. 525/331.9 |
| 2003/0134943 A1 | 7/2003 | Labarre et al. |
| 2003/0212185 A1 | 11/2003 | Vasseur |
| 2004/0079504 A1 | 4/2004 | Lafon et al. |
| 2004/0167705 A1 | 8/2004 | Lingman et al. |
| 2006/0128854 A1* | 6/2006 | Bowen et al. ................. 524/261 |
| 2007/0112120 A1 | 5/2007 | Vasseur |
| 2008/0125534 A1 | 5/2008 | Kondou |

FOREIGN PATENT DOCUMENTS

| | | |
|---|---|---|
| EP | 0 501 227 A1 | 9/1992 |
| EP | 0 692 492 A1 | 1/1996 |
| EP | 0 692 493 A1 | 1/1996 |
| EP | 0 735 088 A1 | 10/1996 |
| EP | 0 767 206 A1 | 4/1997 |
| EP | 0 786 493 A1 | 7/1997 |
| EP | 0 881 252 A1 | 12/1998 |
| EP | 1 321 488 A1 | 6/2003 |
| EP | 1 834 980 A1 | 9/2007 |
| WO | WO 99/02590 A1 | 1/1999 |
| WO | WO 99/02601 A1 | 1/1999 |
| WO | WO 99/02602 A1 | 1/1999 |
| WO | WO 99/06480 A1 | 2/1999 |
| WO | WO 00/05300 A1 | 2/2000 |

(Continued)

OTHER PUBLICATIONS

International Search Report (PCT/ISA/210) issued on Jan. 24, 2011, by European Patent Office as the International Searching Authority for International Application No. PCTEP2010/066044.

Primary Examiner — Hannah Pak
(74) Attorney, Agent, or Firm — Dickinson Wright PLLC

(57) ABSTRACT

The invention relates to a method for preparing a silica/natural rubber masterbatch, comprising the following successive steps:
  doping the silica with an at least divalent metallic element;
  preparing at least one dispersion of the resulting doped silica in water;
  bringing a natural rubber field latex into contact with the aqueous doped-silica dispersion and mixing them together so as to obtain a coagulum;
  recovering the coagulum; and
  drying the recovered coagulum so as to obtain the masterbatch.

9 Claims, No Drawings

(56) References Cited

FOREIGN PATENT DOCUMENTS

| WO | WO 00/05301 A1 | 2/2000 |
| WO | WO 01/53386 A1 | 7/2001 |
| WO | WO 02/10269 A2 | 2/2002 |
| WO | WO 02/051750 A1 | 7/2002 |
| WO | WO 03/016837 A1 | 2/2003 |

* cited by examiner

METHOD FOR PREPARING A MASTERBATCH OF NATURAL RUBBER AND SILICA

The invention relates to the preparation of a silica/natural rubber masterbatch comprising at least a modified silica and a natural rubber latex. The term "masterbatch" denotes a composition based on an elastomer in which a filler and possibly other additives have been introduced.

The present invention relates in particular to the use of such a masterbatch for manufacturing diene rubber compositions reinforced with an inorganic filler, said compositions being intended for manufacturing tyres or semi-finished products for tyres, in particular treads for these tyres.

To obtain the optimum reinforcing properties conferred by a filler in a tyre tread and a high wear resistance, it is known generally to be appropriate for this filler to be present in the elastomeric matrix in a final form which is both as finely divided as possible and as uniformly distributed as possible. However, such conditions can be achieved only when this filler has a very good capability, on the one hand, of being incorporated into the matrix during compounding with the elastomer and of deagglomerating and, on the other hand, of being uniformly dispersed in this matrix.

As is known, carbon black has such capabilities, which is in general not the case of inorganic fillers, particularly silicas. This is because, for reciprocal affinity reasons, these inorganic filler particles have an annoying tendency to clump together in the elastomeric matrix. Such interaction has the deleterious consequence of limiting the dispersion of the filler and therefore the reinforcing properties to a level substantially below that which would be theoretically possible to achieve if all the inorganic filler/elastomer bonds capable of being created during the compounding operation were actually to be obtained. These interactions moreover tend to increase the viscosity in the uncured state of the rubber compositions and therefore to make them more difficult to process than when carbon black is present.

Since fuel saving and the need to protect the environment have become a priority, it has proved necessary to produce tyres having a reduced loading resistance without penalizing their wear resistance.

This has been made especially possible by the use, in the treads of these tyres, of novel rubber compositions reinforced with inorganic fillers, in particular specific silicas of the highly dispersible type, that are capable of rivalling from the reinforcing standpoint a conventional tyre-grade carbon black, while offering these compositions a lower hysteresis, which is synonymous with a lower rolling resistance for tyres containing them, and also improved grip on wet, snow-covered or icy ground.

Treads filled with such HD (highly dispersible) silica or HDS (highly dispersible silica) that can be used in tyres having a low rolling resistance, sometimes termed "green tyres", due to the saving of energy offered to the user ("green tyre concept"), have been abundantly described. The reader may in particular refer to the patent applications EP 501 227, EP 692 492, EP 692 493, EP 735 088, EP 767 206, EP 786 493, EP 881 252, WO99/02590, WO99/02601, WO99/02602, WO99/06480, WO00/05300 and WO00/05301.

These documents of the prior art teach the use of HD silicas having a BET specific surface area of between 100 and 250 $m^2/g$. In practice, one HD silica having a high specific surface area used in the "green tyre" field is particularly the silica "Zeosil 1165 MP" (having a BET surface area of about 160 $m^2/g$) sold by the company Rhodia. The use of this Zeosil 1165 MP silica makes it possible to obtain good compromises in terms of tyre performance, especially satisfactory wear resistance and rolling resistance.

The benefit of using silica having a high specific surface area lies mainly in the possibility of increasing the number of silica-elastomer bonds and therefore of increasing the level of reinforcement of the elastomer. This is why it appears advantageous to use, in tyre tread rubber compositions, silicas having a high specific surface area, possibly higher than that conventionally used, namely around 160 $m^2/g$, so as in particular to improve the wear resistance of these treads. However, the dispersibility of the filler and the increase in its specific surface area are considered to be conflicting properties. This is because a high specific surface area means an increase in the interactions between filler particles and therefore poor filler dispersion in the elastomer matrix and difficult processing.

Another type of solution for improving the dispersibility of the filler in the elastomer matrix has been envisaged, which consists in compounding the filler and the elastomer in the "liquid" phase. To do so, the process involves an elastomer in latex form, which is in the form of water-dispersed elastomer particles, and an aqueous dispersion of the filler, that is to say a silica dispersed in water, usually called a "slurry". However, bringing the elastomer latex into contact with the slurry does not allow coagulation within the liquid medium, which coagulation would be necessary in order to achieve a solid which, after drying, would result in the desired silica/elastomer masterbatch being obtained. This is because silica aggregates are typically hydrophilic in nature and have an affinity with water. Thus, the silica aggregates have a higher affinity with water than with the elastomer particles themselves.

However, various solutions have been proposed for obtaining this coagulation and good dispersion of the filler in the elastomeric matrix in the "liquid" phase via the combined use of an agent for increasing the affinity between the elastomer and the silica, such as a coupling agent, and of an agent, called a coagulant, for producing the coagulation.

Thus, for example, the patent U.S. Pat. No. 5,763,388 proposes incorporating silica into the rubber latex by treating the silica with a cutting agent and mixing the resulting treated silica with conventional coagulants.

The patent EP 1 321 488 also proposes bringing an aqueous dispersion of negatively charged silica into contact with a diene elastomer latex and with an emulsion containing a polysulfide cutting agent in the presence of a coagulant, such as a polyamine.

The applicants have surprisingly discovered a method of obtaining a silica/elastomer masterbatch prepared in "liquid" phase without using either a coagulant or a coupling agent. Such a method makes it possible, in addition, not only to achieve a very good yield (greater than 80 wt %) in respect of the amount of filler introduced beforehand, but also good dispersion of the filler in the elastomeric matrix.

Of course, such a method seems to be all the more beneficial if it is carried out with highly dispersible silicas, as presented above.

The method for preparing a silica/natural rubber masterbatch according to the invention comprises the following successive steps:
  doping the silica with an at least divalent metallic element;
  preparing at least one dispersion of the resulting doped silica in water;
  bringing a natural rubber field latex into contact with the aqueous doped-silica dispersion and mixing them together so as to obtain a coagulum;
  recovering the coagulum; and
  drying the recovered coagulum so as to obtain the masterbatch.

According to one embodiment of the method, the coagulum recovery step is carried out by a filtering operation.

According to another embodiment, the coagulum recovery step is carried out by a centrifuging operation.

According to one embodiment of the invention, the silica is a precipitated silica.

Advantageously, the metallic element is aluminium, one of the following conditions preferably being satisfied:
(i) the formulation pH is between 3.5 and 6;
(ii) the formulation pH is between 6 and 8 and the level of aluminium doping of the silica is equal to or greater than $(1.75 \times pH - 10.5)$;
(iii) the formulation pH is greater than 8 and the level of aluminium doping of the silica is equal to or greater than 3.5% by weight.

Another subject of the invention is a silica/diene elastomer masterbatch prepared according to the method comprising the following successive steps:
doping the silica with an at least divalent metallic element;
preparing at least one dispersion of the resulting doped silica in water;
bringing a natural rubber field latex into contact with the aqueous doped-silica dispersion and mixing them together so as to obtain a coagulum;
recovering the coagulum; and
drying the recovered coagulum so as to obtain the masterbatch.

Yet another subject of the invention is a rubber composition based on at least one silica/diene elastomer masterbatch prepared according to the invention in accordance with the aforementioned invention, and also a finished or semi-finished article, a tyre tread, and a tyre or semi-finished product comprising at least one such rubber composition.

The expression "doping the silica with a metallic element" is understood to mean modifying the surface of the silica so as to incorporate this metallic element into the interior of the peripheral layers of the silica and/or on the surface of this silica. By extension, the term "doped silica", in particular "aluminium-doped silica", is understood to mean a silica having a metallic element, in particular aluminium, in the interior of its peripheral layers and/or on its surface.

I—MEASUREMENTS AND TESTS

I-1) Measuring the Divalent Metal Doping

This method is used to assay the surface aluminium of the doped silicas by atomic emission spectroscopy (ICP-AES). These silicas are prepared by doping a commercial silica.

Since the silica is not digested, this method does not allow the aluminium present in the core of the silica to be assayed.

a) Principle

The aluminium is dissolved with hot sulphuric acid and then assayed by inductively coupled plasma-atomic emission spectroscopy (ICP-AES). The surface aluminium content is calculated by subtracting the aluminium content of the starting commercial silica. The calibration range used is 0 to 20 mg/l of aluminium; two measurements are carried out on each specimen.

b) Apparatus
Precision (0.1 mg scale) balance;
Funnels;
100 ml class A volumetric flasks;
250 ml class A volumetric flasks;
10 ml measuring cylinder or 10 ml acid dispenser;
50 ml measuring cylinder;
a 0.1-1 ml variable-volume calibrated micropipette (for example an Eppendorf micropipette);
a 0.5-5 ml variable-volume calibrated micropipette (for example an Eppendorf micropipette);
Cellulose acetate syringe filters of 0.45 μm pore diameter;
30 ml sample holders;
ICP spectrometer (for example: a Jobin Yvon Activa M spectrometer);
250 ml wide-necked Erlenmeyer flasks;
Sand bath.

c) Reactants
Ultrapure water;
Concentrated nitric acid (for example RP NORMAPUR REF 20.422.297)
d=1.41%
% $HNO_3$=65;
Concentrated hydrochloric acid (for example RP NORMAPUR REF 20.252.290)
d=1.18%
% HCl=37;
Concentrated sulphuric acid (for example RP MERCK REF 1.00731.1000)
d=1.84%
% $H_2SO_4$=95-97;
1 g/l aluminium standard solution (for example MERCK REF HC 812641).

d) Operating Method d)-1-Preparation of a 5 vol % Sulphuric Acid Solution 200 ml of demineralized water are introduced into a 1-litre class A volumetric flask using a measuring cylinder. Next, 50 ml of concentrated (3.4) sulphuric acid are introduced using a measuring cylinder. After homogenization, the solution is left to cool down. The flask is brought up to the volume line with demineralized water.

d)-2-Preparation of the Silicas in an Open System on a Sand Bath

The measurements are carried out twice. It is preferable to perform a blank procedure during each series of measurements (preparation under the same conditions but with no specimen). The raw silicas before doping are also analyzed.

250 mg of silica is weighed in an Erlenmeyer flask;
20 ml of 5% (§5.1) sulphuric acid is poured into the flask;
Using a sand bath, the contents are heated until completely dry;
The flask is left to cool down;
The walls of the Erlenmeyer flask are rinsed with a little water and then 12.5 ml of 65% (§3.2) concentrated nitric acid and 12.5 ml of 37% concentrated hydrochloric acid are added (only for Al-doped silicas) (§3.3);
The contents are brought to boiling;
The flask is left to cool down and then the contents quantitatively transferred into a 250 ml calibrated flask;
The flask is brought up to the volume line using demineralized water;
The solution is filtered using a 0.45 μm syringe filter;
The ICP-AES analysis is carried out.

d)-3-Preparation of the Calibration Range

Preparation of the Aluminium Calibration Range.

The reactants given in the following table correspond to the concentrations mentioned above in section c).

| c | E1 | E2 | E3 | E4 | |
|---|----|----|----|----|---|
| 0 | 5 | 15 | 30 | 20 | mg/l of aluminium |
| 90 | 89.5 | 89.0 | 88.5 | 88.0 | ml of ultrapure water |
| 5 | 5 | 5 | 5 | 5 | ml of hydrochloric acid using a dispenser |

-continued

| c | E1 | E2 | E3 | E4 | |
|---|----|----|----|----|---|
| 5 | 5 | 5 | 5 | 5 | ml of nitric acid using a dispenser |
| 0 | 0.5 | 1.0 | 1.5 | 2.0 | ml of 1000 mg/l aluminium calibration solution using a micropipette |
| 100 | 100 | 100 | 100 | 100 | total volume (in ml) |

These calibration standards keep for four months.
Preparation of a 10 mg/l Validation Control The verification control is prepared during each series of measurements in the same way as the calibration standards above, by introducing 1 ml of 1 g/l aluminium standard solution of a different batch, enabling the calibration to be validated. The verification control is not kept after use.

d)-4-Assaying by ICP-AES
Analysis Sequence
  1—Calibration;
  2—10 mg/l (magnesium) or 10 mg/l (aluminium) validation control;
  3—Specimens+blank procedure;
  4—E5 (20 mg/l aluminium) verification standard.

Validation of the calibration for the 0-50 mg/l aluminium range:
  Validation control (theoretical value: 20 mg/l)
  Tolerances: 19.6 mg/l<[aluminium]<20.4 mg/l.

Validation of the analysis sequence (at the end of the measurement, demonstrates that there was no drift) for the 0-50 mg/l aluminium range:
  E5 verification standard (theoretical value: 50 mg/l)
  Tolerances: 49 mg/l<[aluminium]<51 mg/l.

Activa ICP-AES Parameters
Plasma and Spray Settings:
  Cyclonic spray chamber (Scott chamber);
  Pump speed: 20 rpm;
  Plasma gas flow rate: 12 l/min;
  Sheath gas flow rate: 0.2 l/min;
  Auxiliary gas flow rate: 0 l/min;
  Spray flow rate*: 0.87 ml/min;
  Spray pressure*: 2.97 bar;
  Rinsing time: 20 s;
  Transfer time: 30 s;
  Stabilization time: 20 s;
  Concentric spray nozzle (Meinhard);
  Generator power: 1100 W.
Detection Parameters:

| Parameters | Al |
|---|---|
| Analysis lines | $\lambda_{Al}$ = 394.401 nm; straight background: 0.0741 nm $\lambda_{Al}$ = 396.152 nm straight background: 0.0783 |
| Integration time | 0.5 s |
| Calculation mode | average (1 point) |
| Observation zone | 1-512 |
| Input slot | 10 |
| Number of duplicates | 3 | e) Results
The surface aluminium content of the specimen (in wt %) is given by:
  Surface Al=% $Al_{doped\ silica}$ −% $Al_{raw\ silica}$;
  Example: $Al_{160\ MP}$=0.23 wt %.

The measurement uncertainty was determined on the Jobin Yvon Activa M ICP-AES spectrometer using three measurements per day over six days. The uncertainty given is three standard deviations. For a 2.53 wt % Al-doped silica, the uncertainty is ±0.23 wt %, which corresponds to a relative uncertainty of 9.09%.

I-2) pH Measurement
The pH is measured using the following method derived from the ISO 787/9 standard (pH of a 5% suspension in water).

Apparatus
Mettler Toledo MP225 pH meter;
Electrodes with automatic temperature compensation:
  Inlab®Reach Pro electrode (for syntheses and pH of slurries)
  Inlab®Solids Pro electrode (for pH of formulations)
Heidolph MR3003 heated magnetic stirrer.
Small Equipment
100 ml glass beaker (diameter: 4.7 cm; height: 7 cm) for pH of an aqueous silica dispersion;
250 ml glass beaker (diameter: 6.5 cm; height: 9.3 cm) for pH of formulations;
Bar magnets matched to the size of the beakers;
5 L glass double-walled reactor.

Operating Method
Operating method for measuring the pH of aqueous dispersions or formulations:
  1/ Calibration of the electrode with 4.01, 7.01 and 10.01 pH buffer solutions;
  2/ Aqueous dispersion (or formulation) stirred by magnetic stirring at 500 rpm;
  3/ Immersion of the electrode in the beaker and reading of the pH.

Operating method for measuring the pH during the doping syntheses:
  1/ Calibration of the electrode with 4.01, 7.01 and 10.01 pH buffer solutions;
  2/ Reaction mixture stirred by magnetic stirring (about 650 rpm);
  3/ Immersion of the electrode in the reactor and reading of the pH.

I-3) Measurement of the Amount of Filler by TGA
The purpose of this operating method is to quantify the categories of the constituents of the rubber compounds. Three temperature ranges each corresponding to one category of constituents, are distinguished:
  between 250 and 550° C., corresponding to organic matter: elastomers, oils, vulcanizing agents, etc.;
  between 550 and 750° C., corresponding to losses;
  above 750° C., corresponding to ash: ZnO, possibly silica, etc.

The method applies both to uncured compounds and to cured compounds.

a)—Apparatus
Thermogravimetric analysis system based on a Mettler Toledo analyzer: TGA 851 or DSC1 TGA model;
1/100 mg balance (make and model of the balance);
70 μl (coverless) alumina crucibles (Mettler Toledo reference 00024123);
various laboratory items of equipment: tweezers, scissors, etc.

b)—Principle
The weight losses of a compound specimen subjected to a temperature rise are monitored. The temperature rise takes place in two steps:
  1/ Heating from 25 to 550° C. in an inert atmosphere ($N_2$) to evaporate the volatile matter and to pyrolyze the organic matter. The volatility of the products resulting therefrom gives rise to a weight loss corresponding firstly (below 300° C.) to the volatile matter and then to the organic matter present initially in the compound.

2/ Heating continuation up to 750° C. in an oxidizing atmosphere (Air or $O_2$) to burn off the carbon black (and/or carbon material). The volatility of the products that results therefrom gives rise to a weight loss corresponding to the initial amount of carbon black (and/or carbon material).

The products that remain after these treatments constitute the ash which is generally composed of inorganic materials, e.g. ZnO, silica, etc.

c)—Measurements c)-1-Specimen Preparation

The amount of product analyzed has to be weighed to within 0.01 mg and is between 20 and 30 mg. It is then placed in a 70 µl alumina crucible (coverless).

c)-2-Definition of the "Method" (Temperature Program)

The following segments are defined in succession:
  1st segment: dynamic segment from 25 to 550° C. at 50° C./min in nitrogen (40 ml/min);
  2nd segment: dynamic segment from 550 to 750° C. at 10° C./min in air (or $O_2$) (40 ml/min);

The "blank curve subtraction" field is activated.

Any measurement is automatically corrected by a blank curve. The latter is produced under the same conditions as the measurement, but with an empty crucible. It is stored and used for all the following measurements (no new blank test necessary before each measurement).

c)-3-Starting the Measurement

By consulting the control window of the furnace, a prior check is made to ensure that the nitrogen and air flow rates (40 ml/min) are suitably set. If not, they are adjusted using the adjustments located on the "gas box".

Blank curve

The blank curve is produced using the procedure described in the TGA operating manual.

Measurement

The measurement is carried out using the procedure described in the TGA operating manual.

c)-4-Exploitation of the Curve

Following the instructions of the TGA operating manual:
  the curve to be exploited is selected and opened;
  the 1st plateau, corresponding to the volatile matter, is defined in this curve between 25° C. and approximately 250° C. respectively;
  the weight loss corresponding to the amount of volatile matter (in %) is calculated;
  the 2nd plateau, corresponding to the organic matter, is defined in this curve between the temperature of the approximately 250° C. 1st plateau and 550° C. respectively;
  the weight loss corresponding to the amount of organic matter (in %) is calculated;
  the 3rd plateau, corresponding to the losses, is defined in this curve between 550° C. and 750° C. respectively;
  the weight loss corresponding to these losses (in %) is calculated; and
  the residue or ash content in % is calculated.

c)-5-Presence of Volatile Matter

For certain compounds containing volatile matter that may evaporate at room temperature, there is a risk of loss of material between preparing the specimen and actually starting the measurement.

These losses are not taken into account by the apparatus.

To take these losses into account and obtain the actual composition of the compound, the following procedure may be carried out:

Steps c)-1 to c)-3 described above are carried out with the following two setpoints:
  during preparation of the specimen: the weight of the empty crucible (P0) and the weight of the specimen P1 are noted;
  during execution of the measurement: the "crucible weight" field and the "specimen weight" field are denoted by P0 and P1 respectively.

For the implementation (step c)-4), the TGA machine takes into account, for determining the losses, the mass of the specimen P2 which it calculates at the effective start of the measurement from the weight of the crucible, this being of paramount importance for calculating the residue; P2 is calculated by the TGA machine taking into account the mass P3 (crucible+specimen) at the time T0-P0.

The amounts of the various constituents and that of the residue are calculated relative to the specimen weight P1 defined during the preparation and not relative to P2.

The amount of volatile matter then calculated by the apparatus is erroneous since part of the volatile matter MV, i.e. (P1-P2), has evaporated during the waiting period between preparation and actual start of the measurement. The MV values must therefore be manually recalculated:
  in terms of mass: MV (in mg)=(P1-P2) (in mg)+1st plateau losses (in mg);
  in terms of amounts: T×MV (in %)=100×MV (in mg)/P1, or 100-1st plateau residue (in %).

c)-6-Amount of Filler in % mo

This amount is expressed in % mo, i.e. percentage of organic matter, and obtained by calculation when the TGA measurement is interpreted using the following formula:

$$T \times \text{filler(in \% mo)} = 100 \times [(D)/(B+C)]$$

In this formula, B represents the percentage of organic matter (for the interval between 250 and 550° C.), C represents the percentage of losses (between 550 and 750° C.) and D represents the percentage of residue (above 750° C.).

I-4) Measurement of the Coagulation Yield

The coagulation yield corresponds to the ratio of the recovered dry mass (from which the mass of volatile matter as defined in the TGA measurement protocol in the previous paragraphs has been removed) to the intended starting mass multiplied by one hundred.

II. DETAILED DESCRIPTION OF THE INVENTION

The method for preparing a silica/natural rubber masterbatch according to the invention comprises the following successive steps:
  doping the silica with an at least divalent metallic element;
  preparing a dispersion of the resulting doped silica in water;
  bringing a natural rubber field latex, in particular a natural rubber latex, into contact with the doped silica dispersion and mixing them together; and
  recovering and drying the masterbatch thus obtained.

II-1) Preparation of the Aqueous Silica Dispersion

In the first step of the method, the silica is doped with an at least divalent metallic element. As an at least divalent metallic element, alkaline-earth metals and more particularly aluminium may be particularly mentioned. This step of "doping" the silica may be advantageously carried out according to the protocol explained in detail in the patent application WO 02/051750. The doping level obtained corresponds to the percentage by weight of aluminium per one hundred parts by weight of silica.

For the invention, any silica ($SiO_2$) known to those skilled in the art may be used, especially any precipitated or pyrogenic silica having a BET surface area and a CTAB specific surface area that are both less than 450 $m^2/g$, preferably ranging from 30 to 400 $m^2/g$. In particular, it is possible to use a highly specific silica (or "HDS"). For example, the following silicas may be mentioned: Ultrasil 7000 and Ultrasil 7005 from Degussa; Zeosil 1165MP, 1135MP and 1115MP silicas from Rhodia; Hi-Sil EZ150G silica from PPG; Zeopol 8715, 8745 and 8755 silicas from Huber; and silicas having a high specific surface area as described in the application WO 03/16837.

The doped silica obtained is then dispersed in water, preferably so as to obtain a dispersion of sufficient viscosity to be easily "handlable". For example, an aqueous dispersion of doped silica with a silica content of 4% by weight in water may be produced.

Advantageously, the dispersion is sonicated so as to stabilize the aggregates in the water, thereby making it possible to improve the aqueous doped-silica dispersion in the masterbatch subsequently produced. This sonication may especially be carried out using a 1500 watt Vibracell generator manufactured by Sonics and Materials Inc. with a PTZ (reference 75010) crystal piezoelectric converter, a booster for the probe and a titanium alloy probe 19 mm in diameter (for a height of 127 mm).

It may be useful to add an acidifying agent to this aqueous doped-silica dispersion, such as strong acids or weak acids, so as to enable the pH of the aqueous doped-silica dispersion to be modified so as to obtain the desired formulation pH upon bringing the two dispersions described below into contact with each other.

A person skilled in the art must then perform several compacting operations so as to adjust the pH of the aqueous dispersion in order to obtained the desired formulation pH. A person skilled in the art knows that it is not possible to determine a priori, according to the volumes poured and the pH of each of the dispersions, what the pH of the formulation will be, owing to the very many variables associated with the nature of the elastomer latex that have an influence on the changes in pH.

II-2) Natural Rubber Latex

Natural rubber exists in various forms as explained in detail in Chapter 3 "Latex concentrates: properties and composition" by K. F. Gaseley, A. D. T. Gordon and T. D. Pendle in "Natural Rubber Science and Technology", edited by A. D. Roberts, Oxford University Press, 1988. In particular, several forms of natural rubber latex are commercially available: natural rubber latex called "field latex"; concentrated natural rubber latex; epoxidized latex (or ENR); deproteinized latex; and prevulcanized latex. Field natural rubber latex is a latex in which ammonia has been added to avoid premature coagulation, and concentrated natural rubber latex corresponds to a field latex that has undergone a treatment corresponding to washing followed by further concentration (the various categories of concentrated natural rubber latex are listed in particular in the ASTM D 1076-06 standard).

The latex may be used directly or may be diluted beforehand in water so as to facilitate the processing thereof.

II-3) Bringing the Two Dispersions into Contact with Each Other

The two dispersions are brought into contact with each other. To allow good mixing of these solutions, they may for example be poured into a beaker with magnetic stirring. It is also possible to use any type of apparatus allowing "effective" mixing of two products in liquid phase, and also to use a static mixer such as static mixers sold by Noritake Co., Limited, by TAH in the United States, by KOFLO in the United States, or Tokushu Kika Kogyo Co., Ltd. or a high-shear mixer such as mixers sold by Tokushu Kika Kogyo Co., Ltd. or by PUC in Germany, or by Cavitron in Germany or by Silverson in the United Kingdom.

It is clear that the more effective the mixing step, the better the dispersion. It is therefore preferred to use mixers such as high-shear mixers.

During this phase of mixing the two dispersions together, a silica/elastomer coagulum forms, either in the form of a single solid element in solution or in the form of several separate solid elements.

As soon as the bringing into contact of the two dispersions has taken place, the pH, here the formulation pH, of this new dispersion is measured using the protocol described above in the tests.

Surprisingly, it has been found that in order to effectively obtain a coagulum, with a coagulation yield of 80% or higher, which corresponds to obtaining a masterbatch respecting the initial filler weight ratio relative to the elastomer, thus a 20% difference relative to the initially calculated ratio is deemed to be acceptable, it was necessary to be in one of the following cases:

(i) formulation pH between 3.5 and 6;
(ii) formulation pH between 6 and 8 and level of aluminium doping of the silica equal to or greater than (1.75×pH−10.5);
(iii) formulation pH is greater than 8 and level of aluminium doping of the silica equal to or greater than 3.5% by weight.

The volumes of the two dispersions brought into contact with each other, and in particular the volume of the silica dispersion, depend on the intended silica content for the masterbatch to be produced. Thus, the volume will be adapted accordingly. Advantageously, the intended silica content for the masterbatch is between 20 and 150 phr (parts by weight per one hundred parts of rubber), preferably between 30 and 100 phr, and more preferably between 30 and 90 phr, and even more preferably between 30 and 70 phr.

II-4) Recovery of the Solid Formed.

The solid or solids recovered are filtered or centrifuged. The filtering operation that may be carried out using a filtration sieve may prove to be inappropriate when the coagulum takes the form of many small solid elements. In such a case, it is preferred to carry out an additional centrifuging operation. After this filtering or centrifuging step, the coagulum obtained is dried, for example in an oven.

After this operation, the amount of filler is measured by TGA and the coagulation yield is also measured.

II-5) Rubber Composition

Advantageously, the masterbatches thus produced can be used in rubber compositions, especially for tyres. A person skilled in the art knows that too high an amount of aluminium in such rubber compositions may cause difficulties with respect to vulcanization and will prefer to limit the aluminium content present in the masterbatch by limiting the amount of silica doping to 3.5% by weight.

The rubber compositions for tyres based on masterbatches according to the invention also include, as is known, a coupling agent and a vulcanization system.

It will be recalled here that the term "coupling agent" is understood to mean, as is known, an agent capable of establishing a sufficient bond, of chemical and/or physical nature, between the inorganic filler and the diene elastomer. Such an at least difunctional coupling agent has for example the general simplified formula "Y-Z-X", in which:

Y represents a functional group ("Y" function) which is capable of bonding physically and/or chemically to the inorganic filler, it being possible for such a bond to be established for example between a silicon atom of the coupling agent and the hydroxyl (OH) groups on the surface of the inorganic filler (for example the surface silanols when the filler is silica);

X represents a functional group ("X" function) capable of bonding physically and/or chemically to the diene elastomer, for example via a sulphur atom; and Z represents a divalent group enabling Y to be linked to X.

Coupling agents, especially silica/diene elastomer coupling agents, have been described in a large number of documents, the most well known being difunctional organosilanes carrying alkoxyl functional groups (that is to say, by definition, alkoxysilanes) having "Y" functions and, as "X" functions, functional groups capable of reacting with the diene elastomer such as for example polysulphide functional groups.

Among known alkoxysilane polysulphide compounds that should be particularly mentioned are: bis(3-triethoxysilylpropyl)tetrasulphide (abbreviated to TESPT), having the formula $[(C_2H_5O)_3Si(CH_2)_3S_2]_2$, sold in particular by Degussa under the name "Si69" (or "X50S" when it is supported with 50% by weight on carbon black), in the form of a commercial blend of polysulphides $S_x$ with an average x value close to 4.

It should be noted that it is possible to envisage introducing the coupling agent during preparation of the masterbatch so as to obtain, directly, a silica/elastomer masterbatch that also contains a coupling agent. The coupling agent may thus be added before or during the operation of bringing the aqueous doped-silica dispersion into contact with the natural rubber latex.

These rubber compositions conforming to the invention may also contain all or some of the additives normally used in elastomer compositions intended for the manufacture of tyres, in particular of treads, such as for example plasticizers, oil extenders, whether the latter are of aromatic or non-aromatic nature, pigments, protective agents, such as antiozone waxes, chemical antiozonants, antioxidants, anti-fatigue agents, reinforcing resins, methylene acceptors (for example, phenol-novolac resin) or methylene donors (for example, HMT or H3M) as described, for example, in the application WO 02/10269, a crosslinking system based on either sulphur or on sulphur donors, and/or on a peroxide and/or on bismaleimides, vulcanization accelerators and vulcanization activators.

Preferably, these compositions comprise, as preferred non-aromatic or very weakly aromatic plasticizing agent, at least one compound chosen from the group consisting of naphthenic oils, paraffinic oils, MES oils, TDAE oils, glycerol esters (in particular trioleates), hydrocarbon-based plasticizing resins exhibiting a high $T_g$ preferably greater than 30° C., and mixtures of such compounds.

These compositions may also contain, in addition to the coupling agents, coupling activators, covering agents (comprising for example the sole Y functional group) of the reinforcing inorganic filler or more generally processing aids known for improving the dispersion of the inorganic filler in the rubber matrix and for lowering the viscosity of the compositions, for improving their ease of processing in the uncured state, these agents being for example hydrolysable silanes, such as alkylalkoxysilanes (especially alkyltriethoxysilanes), polyols, polyethers (for example polyethyleneglycols), primary, secondary or tertiary amines (for example trialkanolamines), hydroxylated or hydrolysable POSs, for example α,ω-dihydroxy-polyorganosiloxanes (especially α,ω-dihydroxy-polydimethylsiloxanes), and fatty acids such as, for example, stearic acid.

The additives described above—oil, antioxidant and covering agent—could also be incorporated into the masterbatch before formation of the coagulum.

II-6). Manufacture of the Rubber Compositions

The rubber compositions of the invention are manufactured in appropriate mixers, using two successive phases of preparation according to a general procedure well known to those skilled in the art: a thermomechanical kneading or working first phase (sometimes called "non-productive" phase) at high temperature, up to a maximum temperature of between 130° C. and 200° C. and preferably between 145° C. and 185° C., followed by a mechanical working second phase (sometimes called "productive" phase) at lower temperature, typically below 120° C., for example between 60° C. and 100° C., during which finishing phase the crosslinking or vulcanization system is incorporated.

According to a preferred embodiment of the invention, all the base constituents of the compositions of the invention, with the exception of the vulcanization system, namely the masterbatch, the coupling agent (if it is not already present in the masterbatch) and, where appropriate, the carbon black, are incorporated intimately, by kneading, into the diene elastomer during said non-productive first phase, that is to say at least these various base constituents are introduced into the mixer and thermomechanically kneaded, in one or more steps, until the maximum temperature of between 130° C. and 200° C., preferably between 145° C. and 185° C., is reached.

To give an example, the first (non-productive) phase is carried out in a single thermomechanical step during which all the necessary constituents, the possible complementary covering or processing agents and other various additives with the exception of the vulcanization system, are introduced into an appropriate mixer, such as a standard internal mixer. The total kneading time in this non-productive phase is preferably between 1 and 15 minutes. After the compound thus obtained during the non-productive first phase has cooled down, the vulcanization system is incorporated at low temperature, generally in an open mixer such as a two-roll mill, all the ingredients then being mixed (during the productive phase) for a few minutes, for example between 2 and 15 minutes.

When a covering agent is used, its incorporation may be carried out completely during the non-productive phase at the same time as the inorganic filler, or else completely during the productive phase at the same time as the vulcanization system, or else it may be divided over the two successive phases.

It should be noted that it is possible to introduce all or part of the covering agent in a supported form (the covering agent being placed on a support beforehand) on a solid compatible with the chemical structures corresponding to this compound. For example, during the division between the above two successive phases, it may be advantageous to introduce the second part of the covering agent, on the open mixer, after being placed on a support so as to make it easier to incorporate and disperse it.

The crosslinking system is preferably a vulcanization system, that is to say a system based on sulphur (or on a sulphur donor) and on a primary vulcanization accelerator. Various known vulcanization activators or secondary accelerators, such as zinc oxide, stearic acid or equivalent compounds, guanidine derivatives (in particular diphenylguanidine), are added to this base vulcanization system, these being incorporated during the non-productive first phase and/or during the productive phase as described below.

The sulphur is used at a preferred content of between 0.5 and 12 phr, in particular between 1 and 10 phr. The primary vulcanization accelerator is used at a preferred content of between 0.5 and 10 phr, more preferably between 0.5 and 5.0 phr.

It is possible to use as accelerator (whether primary or secondary) any compound capable of acting as an agent for accelerating the vulcanization of diene elastomers in the presence of sulphur, especially accelerators of the thiazole type and derivatives thereof, thiurame-type accelerators and zinc dithiocarbamates. These accelerators are for example chosen from the group formed by 2-mercaptobenzothiazyl disulphide (abbreviated to MBTS), tetrabenzylthiurame disulphide (TBZTD), N-cyclohexyl-2-benzothiazyl sulfenamide (CBS), N,N-dicyclohexyl-2-benzothiazyle sulfenamide (DCBS), N-tert-butyl-2-benzothazyle sulfenamide (TBBS), N-tert-butyl-2-benzothiazyle sulfenimide (TBSI), zinc dibenzyldithiocarbamate (ZBEC) and mixtures of these compounds.

The final composition thus obtained is then calendered, for example in the form of a sheet or a plaque, especially for laboratory characterization, or else extruded in the fond of a rubber strip that can be used for example as a tyre tread for a passenger vehicle.

III EXEMPLARY EMBODIMENTS OF THE INVENTION

III.1 Preparation of the Aluminium-Doped Silica

Methodology of the Al-doping operation carried out in the laboratory (intended doping level: 5 wt %).

Al-doping operation on a silica sold under the name 160MP by Rhodia at the intended 5 wt % (theoretical mass of doped product produced: 165.30 g):

- for the intended 5 wt % Al, 6.2 wt % Al is introduced, since the doping yield is approximately 70-80 wt % (source: patent WO 2002/051750 A1);
- the pH is kept at 7.5 during the addition of aluminium sulphate so as to prevent the viscosity of the medium from strongly increasing.

Equipment
- One 5-litre double-walled reactor fitted with a bladed stirrer having 6 Teflon paddles;
- One Heidolf stirring motor, model RZR2101;
- One Huber thermostatted bath, model CC245;
- Two Masterflex peristaltic pumps (model 7523-25 for 10 to 600 rpm or model 7523-37 for 1 to 100 rpm), fitted with an easy-load pump head, model 7518-60;
- One calibrated, temperature-compensated, Mettler Toledo Inlab®Reach Pro pH electrode+1 MP225 Mettler Toledo pH meter;
- One magnetic stirrer+one bar magnet;
- Tygon tubing, glassware;
- Ultra-Turrax® T25B rotor-stator homogenizer fitted with a seal generator shaft, N type S25N-18G and 1500-watt Vibracell generator manufactured by Sonics and Materials Inc. with a PZT crystal piezoelectric converter (reference 75010), a booster for the probe and a titanium alloy probe of 19 mm diameter (for a height of 127 mm).

The reactants are given in the following table:

| Rates of addition into the medium | Reactants | Details | Quantities |
| --- | --- | --- | --- |
| — | 160MP | MV: 6.26 wt % | 157.43 g dry equivalent, i.e. 167.95 g weighed |
| — | Demineralized water | — | 3.935 l |

-continued

| Rates of addition into the medium | Reactants | Details | Quantities |
| --- | --- | --- | --- |
| 15 ml/min | $Al_2(SO_4)_3 \cdot 18H_2O$ | 208 g/l $Al_2(SO_4)_3$ aqueous solution (about 350 ml) | 131.05 g in 258.78 g of water |
| 11-15 ml/min | NaOH | 5M | About 280 ml |
| 15 ml/min | $H_2SO_4$ | 0.82M | About 90 ml |

Operating Method

The contents of two beakers [2×(83.97 g of 160MP in 485.17 g of water)] are sheared using the aforementioned homogenizer for five minutes at 17500 rpm and then sonicated at 100% maximum power of a 1500 W probe, for eight minutes.

The suspension thus sheared is introduced into the reactor and 2964.67 ml of demineralized water added so as to obtain an initial concentration of 40 g/l, i.e. 3.8 wt %.

The medium is stirred at 650 rpm and heated to 60° C. (controlled using a temperature probe integrated into the electrode and set at this temperature).

The $Al_2(SO_4)_3 \cdot 18H_2O$ is added at 15 ml/min and the pH of the medium is stabilized to 7.5 by simultaneously adding sodium hydroxide.

The reaction mixture is left, with stirring and heating, for 30 minutes (regulation of the pH to 7.5) and then the pH is lowered to 4.5 by adding $H_2SO_4$.

The medium is left with stirring and at temperature, for a further 10 minutes, for stabilizing the pH to 4.5, and then spin-dried using a spin dryer of the RC30VxR type sold by Rousselet Centrifugation S.A., and the filler cake thus produced is washed with 10 litres of demineralized water. The cake obtained is resuspended in the demineralized water to a concentration of about 10 wt %.

Volatile matter in the suspension contained in the suspension flask (for the purpose of using it to manufacture masterbatches) is measured so as to know the precise mass concentration of the suspension.

Equipment:
- Mettler Toledo halogen moisture analyzer (thermobalance), model HR73, connected to a computer;
- disposable aluminium sample pan (a consumable suitable for the apparatus).

Operating Method:

After having obtained the information about the specimen and the measurement conditions (160° C. with no temperature ramp, duration 30 minutes) and after having calibrated the aluminium sample pan, about 2.5 g of specimen are introduced into the sample pan and the measurement is started.

The protocol to be followed for the different doping levels is identical, with the exception of the amount of aluminium precursor salt to be introduced, and is summarized in Table 1 below, in which the amounts of aluminium salt used are given for the intended doping levels.

TABLE 1

| Al doping | |
| --- | --- |
| intended doping level (wt %) | Mass of aluminium salt (g) |
| 5 | 131.05 |
| 2.5 | 52.42 |
| 1 | 19.44 |

III.2 Preparation of the Masterbatches

The aluminium-doped silicas obtained above are dispersed in water so as to obtain a concentration of 4% by weight of silica in the water.

Each silica dispersion, sonicated and then left with stirring for 10 minutes (with possible adjustment of the pH during the final minute), is brought into contact with a natural rubber field latex maintained under magnetic stirring, the aqueous silica dispersion being poured very rapidly into this latex.

The volume of the aqueous doped-silica dispersion is adapted relative to the volume of the latex according to the concentration of the silica and the concentration of the latex in order to have, upon bringing the two dispersions (silica and elastomer latex) into contact with each other, the desired formulation pH.

For examples, an amount of silica of 50 parts by weight per one hundred parts of elastomer was chosen, corresponding here to 50% mo (because masterbatches described here comprise only the silica and the diene elastomer).

As soon as all of the aqueous doped-silica dispersion has been poured, the pH measurement electrode is inserted into the mixture so as to measure the formulation pH. As explained previously, to obtain the desired pH it is necessary to adjust the pH of the aqueous doped-silica dispersion after it has been sheared but before it has been brought into contact with the latex. It is therefore necessary to carry out an experiment in order to adjust the pH of the aqueous doped-silica dispersion.

The mixture is kept for a few minutes with magnetic stirring before the coagulum formed is recovered. So as to have identical operating method conditions for the various trials, the coagulum formed, or the solids (commonly called crumbs) formed, are centrifuged, including in the cases when the visual appearance of the coagulum allows a filtering operation to be envisaged. After transfer to a 250 ml Nalgene bottle, the centrifugation is carried out using a Sigma 4K15 bucket centrifuge at 8000 rpm for 10 minutes.

The coagulum thus recovered is dried under a fume hood at room temperature for 24 hours and then in an oven for 24 hours at 65° C. under a pressure of 300 mbar so as to remove the last traces of water.

The filler content is then measured by TGA and the coagulation yield determined.

III-3 Example 1

The purpose of this example is to demonstrate the proper operation of the method according to the invention, in particular with regard to the formulation pH measured for a given doping level of the silica.

Trials E1, E2, E3 and E4 were carried out in accordance with the method detailed in the above section with:
- a natural rubber field latex from the Société Africaine des Plantations d'Hévéas (SAPH; African Hevea. Plantation Company) with a percentage by weight of ammonia. NH$_4$(OH) of 0.71 and a percentage by weight of solids of 37.2 at 160° C. for 30 minutes;
- an aluminium-doped silica with a doping level of 1% by weight; and
- an amount of silica, upon bringing the two dispersions into contact with each other, of 50 phr.

The sole difference between these four trials consists, during the operating method detailed above, of the modification of the pH of the aqueous doped-silica dispersion so as to modify the formulation pH.

Thus trials E1, E2, E3 and E4 differ from one another by their formulation pH, upon bringing the dispersions (the aqueous silica dispersion and the elastomer latex) into contact with each other, as follows:
- in the case of E1, the formulation pH was 4.5;
- in the case of E2, the formulation pH was 6.5;
- in the case of E3, the formulation pH was 7;
- in the case of E4, the formulation pH was 8.3.

The results (yield and filler content) obtained for these four trials are given in Table 2 below:

TABLE 2

| Trial | Formulation pH | Yield (wt %) | Filler content (% mo) |
|---|---|---|---|
| E1 | 4.5 | 81.1 | 57.2 |
| E2 | 6.5 | 86.8 | 50.8 |
| E3 | 7 | — | — |
| E4 | 8.3 | — | — |

The table shows that trials E3 and E4 (having a formulation pH of 7 and 8.3 respectively) did not allow the elastomer with the doped silica to coagulate. In these two trials, demixing between the silica and the latex occurred during the centrifugation recovery step, and therefore no coagulum was obtained. For trials E1 and E2, acceptable silica contents (between 40% mo and 60% mo) are obtained at the same time as a greater than 80% yield.

III-4 Example 2

The purpose of this example is to demonstrate the proper operation of the method according to the invention, in particular with respect to the formulation pH measured for a level of silica doping different to Example 1.

Trials E'1, E'2, E'3 and E'4 were produced in accordance with the method detailed in the previous section with a field latex identical to that cited in Example 1 and with an aluminium-doped silica having a doping level of 2.5% by weight, the amount of silica, upon bringing the two dispersions into contact with each other, being 50 phr.

As in Example 1, the sole difference between these four trials consists, when carrying out the operating method detailed above, of the modification of the pH of the aqueous doped-silica dispersion so as to modify the formulation pH, thus:
- in the case of E'1, the formulation pH is 3;
- in the case of E'2, the formulation pH is 5;
- in the case of E'3, the formulation pH is 7;
- in the case of E'4, the formulation pH is 8.

The results (yield and filler content) obtained for these four trials are given in Table 3 below:

TABLE 3

| Trial | Formulation pH | Yield (wt %) | Filler content (% mo) |
|---|---|---|---|
| E'1 | 3 | 91.6 | 48.2 |
| E'2 | 5 | 94.5 | 45.6 |
| E'3 | 7 | 85.6 | 49.3 |
| E'4 | 8 | 78.5 | 69.1 |

This table shows in the case of trial E'4 (the formulation pH of which is 8) that the silica content is not within the acceptable tolerance (20% difference in relation to the 50% mo target), or the yield (which is less than 80%). By contrast, trials E'1, E'2 and E'3 enable masterbatches to be obtained with both acceptable silica contents (between 40% mo and 60% mo) and a coagulation yield greater than 80%.

III-5 Example 3

The purpose of this example, like the previous two examples, is to demonstrate the proper operation of the method according to the invention, in particular with respect to the formulation pH measured for a level of silica doping different to the first two examples.

Trials E"1 and E"2 are carried out under conditions identical to those of the previous examples with an aluminium-doped silica having a doping level of 5% by weight.

Trials E"1 and E"2 differ from each other as follows:
in the case of E"1, the formulation pH is 6.5;
in the case of E"2, the formulation pH is 9.

The results (yield and filler content) obtained for these two trials are given in Table 4 below:

TABLE 4

| Trial | Formulation pH | Yield (wt %) | Filler content (% mo) |
|---|---|---|---|
| E"1 | 6.5 | 91.4 | 48.3 |
| E"2 | 9 | 94.7 | 47 |

For trials E"1 and E"2 (having a formulation pH of 6.5 and 9 respectively), acceptable silica contents (between 40%mo and 60%mo) are obtained at the same time as a greater than 80% yield.

These three examples clearly show that it is important to be within a given formulation pH range for a given level of silica doping, in order to meet the desired criteria in terms of respected filler content and yield obtained.

The invention claimed is:

1. A method for preparing a silica/natural rubber masterbatch, which can be achieved without adding any coagulant or any coupling agent, comprising in succession:
    doping a silica with an aluminum to form a doped-silica having a level of aluminum doping;
    preparing at least one dispersion of the doped silica in water to form an aqueous doped-silica dispersion;
    providing a natural rubber field latex;
    adjusting the pH of the aqueous doped-silica dispersion so that the pH of a formulation resulting from mixing the natural rubber field latex with the aqueous doped-silica dispersion is:
        between 3.5 and 6; or
        between 6 and 8 when the level of aluminum doping in percent by weight is $\geq(1.75 \times pH - 10.5)$; or
        greater than 8 when the level of aluminum doping $\geq 3.5\%$ by weight;
    adjusting the volume of the aqueous doped-silica dispersion relative to the volume of the natural rubber field latex such that the combined volumes have the desired pH;
    bringing the volume of the natural rubber field latex into contact with the volume of the aqueous doped-silica dispersion and mixing them together to form the formulation and to obtain a coagulum;
    recovering the coagulum; and
    drying the recovered coagulum to obtain a silica/natural rubber masterbatch.

2. The method according to claim 1, wherein recovering the coagulum comprises filtering.

3. The method according to claim 1, wherein recovering the coagulum comprises centrifuging.

4. The method according to claim 1, wherein the silica is a precipitated silica.

5. The method according to claim 1, wherein the amount of silica, upon bringing the natural rubber field latex into contact with the aqueous doped-silica dispersion, is between 20 phr and 150 phr (parts per one hundred parts by weight of elastomer).

6. The method according to claim 5, wherein the amount of silica, upon bringing the natural rubber field latex into contact with the aqueous doped-silica dispersion, is between 30 phr and 100 phr.

7. The method according to claim 6, wherein the amount of silica, upon bringing the natural rubber field latex into contact with the aqueous doped-silica dispersion, is between 30 phr and 90 phr.

8. The method according to claim 7, wherein the amount of silica, upon bringing the natural rubber field latex into contact with the aqueous doped-silica dispersion, is between 30 phr and 70 phr.

9. The method according to claim 1, further comprising adding an aqueous coupling agent dispersion before or upon bringing the aqueous doped-silica dispersion into contact with the natural rubber latex.

\* \* \* \* \*